United States Patent
Xu et al.

(10) Patent No.: US 12,333,239 B2
(45) Date of Patent: Jun. 17, 2025

(54) COPY GENERATION METHOD AND APPARATUS, AND ELECTRONIC DEVICE, STORAGE MEDIUM AND PROGRAM

(71) Applicant: Beijing Wodong Tianjun Information Technology Co., Ltd., Beijing (CN)

(72) Inventors: Liang Xu, Beijing (CN); Xin Wang, Beijing (CN); Yang He, Beijing (CN)

(73) Assignee: Beijing Wodong Tianjun Information Technology Co., Ltd., Beijing (CN)

(*) Notice: Subject to any disclaimer, the term of this patent is extended or adjusted under 35 U.S.C. 154(b) by 0 days.

(21) Appl. No.: 18/251,055

(22) PCT Filed: Oct. 29, 2021

(86) PCT No.: PCT/CN2021/127421
§ 371 (c)(1),
(2) Date: Apr. 28, 2023

(87) PCT Pub. No.: WO2022/095798
PCT Pub. Date: May 12, 2022

(65) Prior Publication Data
US 2023/0385535 A1    Nov. 30, 2023

(30) Foreign Application Priority Data

Nov. 4, 2020 (CN) .......................... 202011219419.8

(51) Int. Cl.
*G06F 40/166* (2020.01)
*G06F 40/106* (2020.01)
(Continued)

(52) U.S. Cl.
CPC .......... *G06F 40/166* (2020.01); *G06F 40/106* (2020.01); *G06F 40/10* (2020.01); *G06Q 30/0627* (2013.01)

(58) Field of Classification Search
None
See application file for complete search history.

(56) References Cited

U.S. PATENT DOCUMENTS 7,720,720 B1 * 5/2010 Sharma ................. G06Q 30/02
705/26.7
10,872,236 B1 * 12/2020 Elor .................... G06V 30/1452
(Continued)

FOREIGN PATENT DOCUMENTS

CN        108932335 A     12/2018
CN        110321537 A     10/2019
(Continued)

OTHER PUBLICATIONS

Nguyen, Hoa Thanh. Automatic catalog construction for Product Search Engines, dissertation, The University of Utah, 2011 (preview retrieved from ProQuest), 20 pages. (Year: 2011).*
(Continued)

*Primary Examiner* — Amelia L Tapp
(74) *Attorney, Agent, or Firm* — Cooper Legal Group, LLC

(57) ABSTRACT

A copy generation method and apparatus, an electronic device, a computer storage medium and a computer program product. The method comprises: acquiring first attribute data of a commodity (100); determining first key attribute data of the commodity on the basis of a pre-trained first copy generation model, wherein the first key attribute data represents part of the first attribute data (101); obtaining a first candidate copy set for the commodity according to the first key attribute data, wherein the first candidate copy set represents a set of at least one piece of commodity copy (102); and screening candidate copy data according to a quality determination rule, and determining a target com-
(Continued)

modity copy, wherein the candidate copy data comprises the commodity copy in the first candidate copy set (103).

14 Claims, 7 Drawing Sheets

(51) Int. Cl.
*G06F 40/10* (2020.01)
*G06Q 30/0601* (2023.01)

(56) References Cited

U.S. PATENT DOCUMENTS

| | | | |
|---|---|---|---|
| 11,288,719 | B2* | 3/2022 | Xu ................. G06V 30/414 |
| 2016/0358489 | A1* | 12/2016 | Canter .................. G06N 5/04 |
| 2018/0341630 | A1* | 11/2018 | DeVries ................ G06F 40/14 |
| 2019/0205750 | A1 | 7/2019 | Zheng |
| 2020/0342164 | A1* | 10/2020 | Satterfield ............ G06F 40/216 |

FOREIGN PATENT DOCUMENTS

| | | |
|---|---|---|
| CN | 110362823 A | 10/2019 |
| CN | 110852793 A | 2/2020 |
| CN | 111242741 A | 6/2020 |
| CN | 111581923 A | 8/2020 |
| CN | 111782784 A | 10/2020 |
| CN | 112434493 A | 3/2021 |

OTHER PUBLICATIONS

Li et al., "Text summarization method based on double attention pointer network." IEEE Access 8 (2020): pp. 11279-11288. (Year: 2020).*
Seifossadat et al., (2024), "Improving semantic coverage of data-to-text generation model using dynamic memory networks," Natural Language Engineering, 30(3), pp. 454-479. (Year: 2024).*
Zhang Qiuyun et al., "CrowdDepict: Personalized Recommendation Content Generation Based on Hetero-geneous Crowdsourced Data", Journal of Frontiers of Computer Science and Technology, 2020, 14(10), the whole document, 11 pages with English abstract.
International Search Report in the international application No. PCT/CN2021/127421, mailed on Jan. 25, 2022, 2 pages.
English translation of the Written Opinion of the International Search Authority in the international application No. PCT/CN2021/127421, mailed on Jan. 25, 2022, 4 pages.
Gao Yang, "Summarization and Deep Learning", Beijing Institute of Technology Press, Apr. 30, 2019, pp. 113-115.

* cited by examiner

| | |
|---|---|
| Commodity attributes | Men's clothing \| C2  Casual pants \| C3  Slim fitting \| shape  Autumn \| suitable season  Youth \| suitable audience  Leisure \| suitable scene  Mid waist \| waist type  Solid color pattern fashion \| style  Slim-fit pants \| shape of pants  Regular \| thickness  Slight elasticity \| elasticity  Simplicity \| popular element  Long pants \| length of pants  Polyester \| main material  Scarecrow \| brand word  MEXICAN \| brand word  Korean style \| style attribute  Slim fitting \| style attribute  Men \| audience attribute  Ankle-tied \| pattern attribute  Pencil pants \| pattern attribute  Pants \| product word  Sport \| style attribute  Harlan pants \| product word  Light grey \| color attribute |
| Decoding | This pair of pants features a solid color design, which is simplicity and fashionable. The design of the high waist proudly modifies the body and makes the body looks slimmer. The casual style is suitable for various occasions. The fashion version is more comfortable to wear, without any sense of constraint, making your wearing more comfortable |
| Determinations of duplication degree and consistency are added | This pair of pants features a solid color design, which is simplicity and fashionable. The design of the middle waist proudly modifies the body and makes the body looks slimmer. The casual style is suitable for various occasions. The fashion version is more comfortable to wear, without any sense of constraint, doubling your fashion sense |

FIG. 2

COPY GENERATION METHOD AND APPARATUS, AND ELECTRONIC DEVICE, STORAGE MEDIUM AND PROGRAM

CROSS-REFERENCE TO RELATED APPLICATION

The application is filed based upon and claims priority to Chinese Patent Application No. 202011219419.8, filed on Nov. 4, 2020 by Beijing Wodong Tianjun Information Technology Co., Ltd., and entitled "METHOD AND DEVICE FOR GENERATING COPY, ELECTRONIC DEVICE, STORAGE MEDIUM AND PROGRAM", the present disclosure of which is hereby incorporated by reference in its entirety.

TECHNICAL FIELD

The present disclosure relates to the field of copy description, and relates to, but is not limited to, a method and device for generating a copy, an electronic device, a computer storage medium and a computer program product.

BACKGROUND

With the development of mobile Internet, the e-commerce industry has developed rapidly. More and more users are used to shopping on the Internet. Due to the popularity of the mobile Internet, users spend more time browsing commodities on the Internet. In order to attract users, higher requirements are put forward for contents of e-commerce merchants. In order to attract users, e-commerce platforms and sellers will provide long copy descriptions for a product in addition to a title of the product, and describe the selling points of the product, so that users can quickly and deeply understand the characteristics of the product. High-quality product description is a key to improve customer experience. Accurate and attractive descriptions can not only help customers make formal decisions, but also improve the possibility of purchase.

In related art, in order to write a high-quality copy, there are relatively high requirements for a person to write a copy, which not only requires high cost, but also has low efficiency when the copy is written by manual and cannot quickly cover a large number of commodities. In addition, due to a lack of accurate measurement methods for a generated long copy of a commodity, it is difficult to ensure the quality of the long copy of the commodity and a fit degree between the long copy and the commodity.

SUMMARY

The present disclosure provides a method and device for generating a copy, an electronic device and a computer storage medium.

The technical scheme of the present disclosure is implemented as follows.

Embodiments of the present disclosure provide a method for generating a copy, including:
acquiring first attribute data of a commodity;
determining first key attribute data of the commodity based on a first copy generation model trained in advance, where the first key attribute data represents a part of attribute data of the first attribute data;
obtaining a first candidate copy set of the commodity according to the first key attribute data, where the first candidate copy set represents a set of at least one commodity copy; and
screening candidate copy data according to a quality determination rule to determine a target commodity copy, where the candidate copy data includes one or more commodity copies in the first candidate copy set.

In some embodiments, the operation of obtaining the first candidate copy set of the commodity according to the first key attribute data includes:
generating a copy description for the first key attribute data in a sentence-wise manner according to the first key attribute data, where each piece of the first key attribute data corresponds to at least one copy description;
splicing the at least one copy description corresponding to each piece of the first key attribute data to generate at least one commodity copy; and
obtaining the first candidate copy set of the commodity based on the at least one commodity copy.

In some embodiments, the operation of obtaining the first candidate copy set of the commodity based on the at least one commodity copy includes:
determining at least one of a duplication degree or a consistency for each commodity copy to obtain a determination result, where the duplication degree represents a degree of duplication between different copy descriptions in each commodity copy, and the consistency represents a consistency degree between attribute data of each commodity copy and the first attribute data; and
obtaining the first candidate copy set of the commodity according to the determination result.

In some embodiments, the first copy generation model is trained by:
acquiring a historical copy and second attribute data of the commodity;
matching the second attribute data with the historical copy to obtain second key attribute data;
taking the historical copy, the second attribute data and the second key attribute data as training data; and
training the first copy generation model by using the training data to obtain a trained first copy generation model.

In some embodiments, the first copy generation model includes: a first decoder and a second decoder, where the first decoder is configured to decode the second attribute data to obtain the second key attribute data, and the second decoder is configured to generate a copy description corresponding to the second key attribute data.

In some embodiments, the operation of training the first copy generation model by using the training data to obtain the trained first copy generation model includes:
adjusting network parameters of the first decoder by using a dual attention mechanism and adjusting network parameters of the second decoder by using a coverage mechanism, to obtain the trained first copy generation model.

In some embodiments, the operation of screening the candidate copy data according to the quality determination rule includes:
after obtaining the first attribute data of the commodity, inputting the first attribute data into at least two copy generation models to obtain a second candidate copy set of the commodity, where the at least two copy generation models includes the first copy generation model; and screening the candidate copy data according to the quality determination rule, where the candidate copy data includes commodity copies in the second candidate copy set.

In some embodiments, the quality determination rule includes at least one of:

screening quality of the commodity copies based on a duplication degree, where the duplication degree represents a degree of duplication between different copy descriptions in each commodity copy;

screening the quality of the commodity copies based on consistency, where the consistency represents a consistency degree between the attribute data of each commodity copy and the first attribute data;

screening the quality of the commodity copies based on a perplexity, where the perplexity represents a clarity degree of each copy description of each commodity copy; or screening the quality of the commodity copies based on an attribute coverage degree, where the attribute coverage degree represents a degree of coverage of the first attribute data in each commodity copy.

Embodiments of the present disclosure also provide a device for generating a copy including an acquiring module, a first determining module, a second determining module and a screening module.

The acquiring module is configured to acquire first attribute data of a commodity.

The first determining module is configured to determine first key attribute data of the commodity based on a first copy generation model trained in advance, where the first key attribute data represents a part of attribute data of the first attribute data.

The second determining module is configured to obtain a first candidate copy set of the commodity according to the first key attribute data, where the first candidate copy set represents a set of at least one commodity copy.

The screening module is configured to screen candidate copy data according to a quality determination rule to determine a target commodity copy, where the candidate copy data includes one or more commodity copies in the first candidate copy set.

Embodiments of the present disclosure provide an electronic device including a memory, a processor and computer programs stored on the memory and executable on the processor. The processor is configured to implement the method provided by one or more technical schemes when executing the programs.

Embodiments of the present disclosure provide a computer storage medium having stored thereon computer programs that, when executed by a processor, cause the processor to implement the method for generating a copy provided by the one or more technical schemes.

Embodiments of the present disclosure also provide a computer program product including computer readable codes, where a processor in an electronic device is configured to implement the method for generating a copy provided by the one or more technical schemes when the computer-readable codes are executed in the electronic device.

The embodiments of the present disclosure provide a method and device for generating a copy, an electronic device, a computer storage medium and a computer program product. The method includes: first attribute data of a commodity is acquired; first key attribute data of the commodity is determined based on a first copy generation model trained in advance, where the first key attribute data represents a part of attribute data of the first attribute data; a first candidate copy set of the commodity is obtained according to the first key attribute data, where the first candidate copy set represents a set of at least one commodity copy; and candidate copy data is screened according to a quality determination rule to determine a target commodity copy, where the candidate copy data includes one or more commodity copies in the first candidate copy set. In this way, the commodity copy does not need to be written by manual, and instead, it is automatically generated directly based on attribute data of a commodity and the first copy generation model trained in advance, which can improve the generation efficiency of the commodity copy. Furthermore, the generated commodity copies are screened according to the quality determination rule, which can ensure the quality of the commodity copy and the fit degree between the commodity copy and the commodity.

BRIEF DESCRIPTION OF THE DRAWINGS

The accompanying drawings, which are incorporated in and constitute a part of this specification, illustrate embodiments consistent with the present disclosure and, together with the description, serve to explain the technical solutions in the embodiments of the present disclosure.

FIG. 2 is a schematic diagram of a result of copy output by a first copy generation model according to an embodiment of the present disclosure;

DETAILED DESCRIPTION

Figure 1:
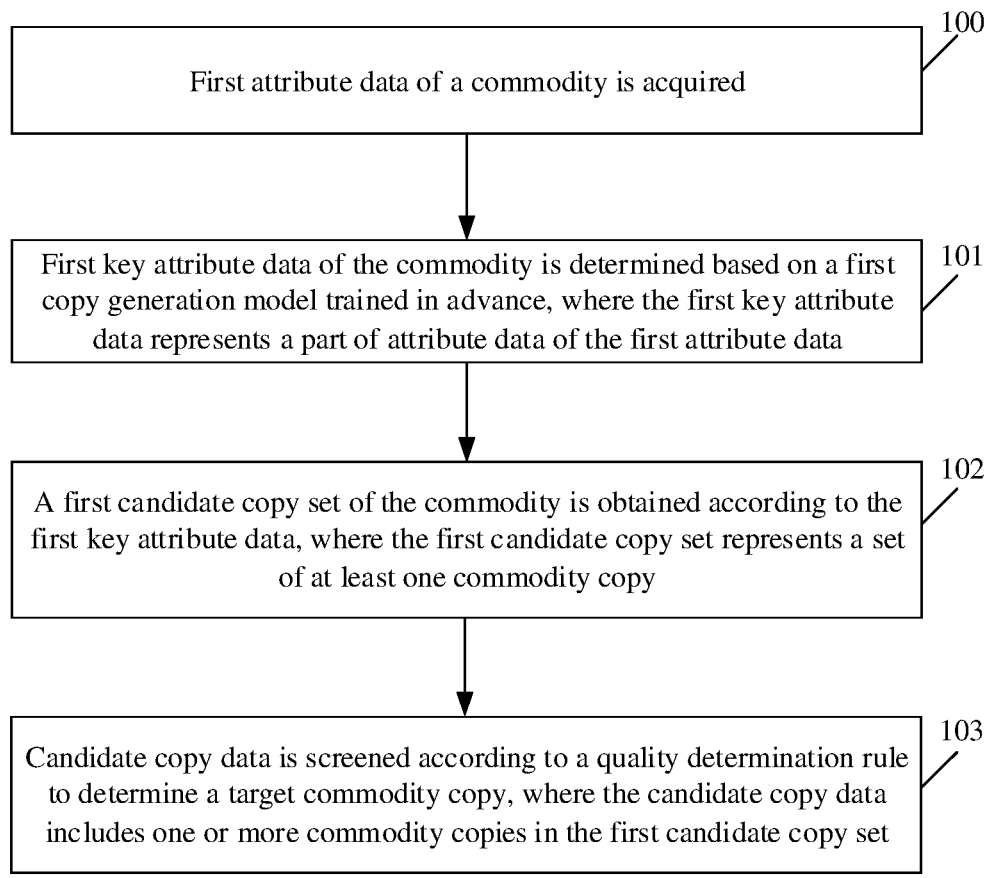
FIG. 1 is a schematic flowchart of a method for generating a copy according to an embodiment of the present disclosure.

Various exemplary embodiments, features and aspects of the present disclosure will be described below in detail with reference to the accompanying drawings. The same reference signs in the drawings represent components with the same or similar functions. Although each aspect of the embodiments is shown in the drawings, the drawings are not required to be drawn to scale, unless otherwise specified.

The present disclosure is described in further detail below in conjunction with the accompanying drawings and embodiments. It should be understood that the embodiments provided herein are intended only to explain the present disclosure and are not intended to limit it. In addition, the embodiments provided below are for implementing some of the embodiments of the present disclosure, rather than providing all of the embodiments of the present disclosure, and the technical solutions described in the embodiments of the present disclosure can be implemented in any combination without conflict.

It is to be noted that, in this disclosure, the terms "include", "including" or any other variation thereof, are intended to cover a non-exclusive inclusion, such that a method or device that includes a list of elements includes not only those elements but also other elements not expressly listed, or also includes elements inherent to such method or device. Without more limitations, an element defined by the statement "including a . . . " does not rule out additional identical elements in a method or device that includes the element (such as an operation in the method or a unit in the device, for example, the unit may be a part of a circuit, a part of a processor, a part of a program or software, etc.).

In the present disclosure, the term "and/or" is only an association relationship describing associated objects and represents that three relationships may exist. For example, I and/or J may represent three conditions, i.e., independent existence of I, existence of both I and J, and independent existence of J. In addition, the term "at least one" herein means any one of multiple elements, or any combination of at least two of the multiple elements, for example, including at least one of I, J or R may means including any one or more elements selected from the set composed of I, J and R.

For example, the method for generating a copy provided by the embodiments of the present disclosure includes a series of operations. However, the method for generating a copy provided by the embodiments of the present disclosure is not limited to the described operations, Likewise, the device for generating a copy provided by the embodiments of the present disclosure includes a series of operations, but the device for generating a copy provided by the embodiments of the present disclosure is not limited to including the modules explicitly described, and may also include modules required to be provided for acquiring relevant time sequence data or performing processing based on the time sequence data.

Embodiments of the present disclosure may be applied to a computer system consisting of a terminal device and a server, and may operate with numerous other general-purpose or special-purpose computing system environments or configurations. Herein, the terminal device may be a thin client, a thick client, a handheld or laptop device, a microprocessor-based system, a set-top box, a programmable consumer electronics product, a networked personal computer, a minicomputer system or the like. The server may be a server computer system, a small computer system, a large computer system, a distributed cloud computing technology environment including any of the above systems, or the like.

Electronic devices such as the terminal device and the server may be described in the general context of computer system executable instructions (such as program modules) executed by the computer system. Generally, the program modules can include routines, programs, object programs, components, logic, data structures, and so on, which perform specific tasks or implement specific abstract data types. The computer system/server may be implemented in a distributed cloud computing environment in which tasks are performed by remote processing devices linked through a communication network. In the distributed cloud computing environment, program modules may be located on a storage medium of a local or remote computing system that includes storage devices.

In view of the above technical problems, the following embodiments are proposed.

In some embodiments of the present disclosure, the method for generating a copy can be implemented by a processor in a device for generating a copy. The processor can be at least one of: an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a microcontroller, or a microprocessor.

FIG. 1 is a schematic flowchart of a method for generating a copy according to an embodiment of the present disclosure. As shown in FIG. 1, the method includes operations 100 to 103.

In operation 100, first attribute data of a commodity is acquired.

Herein, the commodity can represent any type of goods traded by e-commerce platforms or sellers through the Internet. For example, the commodity can be clothing items, food items or the like, or it may be virtual items or the like. The types of goods are not limited in embodiments of the present disclosure.

In the embodiments of the present disclosure, the first attribute data may include attribute words and attributes of the commodity. The attribute words can be words or phrases describing characteristics of the commodity, and the attributes represent words that correspond to the attribute words and can be distinguished from attributes corresponding to other attribute words. A data form of each piece of the attribute data in the first attribute data is attribute word|attribute, for example, off shoulder|collar type, sleeveless|sleeve length, round collar|collar type, splicing|popular element.

In some embodiments, a source of the first attribute data may include at least one of: a commodity title, a commodity category, or extended information of commodity.

In an implementation, the first attribute data of the commodity can be obtained by performing a series of processing procedures such as word segmentation and part-of-speech tagging on the source of the first attribute data. The above processing procedures can be implemented by a sequence tagging model. The implementation can include: firstly, the word segmentation is performed on the input commodity title, commodity category or extended information of commodity to obtain all word sequences; a sequence tagging is performed on each word sequence according to a meaning of the word sequence and context contents, herein, each word sequence corresponds to a distinct attribute word, and a content of the sequence tagging corresponds to the attributes of each attribute word; and furthermore, the first attribute data of the commodity can be obtained through the sequence tagging model.

In some embodiments, the word segmentation is a process of recombining a sequence of successive characters into a word sequence according to certain specifications, and word segmentation processing can be implemented by word segmentation tools or word segmentation algorithms. Herein, the specific implementation manners may be set according to actual application scenarios, which are not limited in the embodiments of the present disclosure, for example, the tool or algorithm may be the pkuseg word segmentation tool, the jieba word segmentation algorithm or the like.

In some embodiments, the part-of-speech tagging can be called grammatical tagging or word-category disambiguation. The part-of-speech tagging, is a text data processing technology that tags the part-of-speech of a word sequence obtained from the word segmentation according to the meaning of the word sequence and the context contents. The part-of-speech tagging can be implemented manually or by specific algorithms.

In an implementation, before the first attribute data of the commodity is obtained, a copy generation request for the commodity sent from a user is received. The copy generation request may include a source of the first attribute data input by the user.

In an implementation, the extended attribute data may be obtained respectively from the commodity title, the commodity category and the extended information of commodity according to sources of the first attribute data. Then the attribute data from three different sources is merged to obtain a complete attribute data of the commodity. The attribute data is filtered according to a preset rule to obtain the attribute data that satisfies the requirements, that is, the first attribute data of the commodity.

In an implementation, it is assumed that the commodity categories are: apparel underwear|first class category, women's clothing|second class category, and dress|third class category; the title of the commodity is: XX brand original designer, women's summer wear, new temperament mid-long irregular halter ceremonial dress skirt, sleeveless off shoulder white dress XL; and the results of the word segmentation and part-of-speech tagging performed on the commodity title are: XX|brand word, original|style attribute, women's|auxiliary product word, summer wear|auxiliary product word, new|style attribute, temperament|style attribute, mid-long|pattern attribute, irregular|pattern attribute, halter|pattern attribute, ceremonial dress|auxiliary product word, skirt|product word, sleeveless|pattern attribute, off shoulder pattern|attribute, white|color attribute, dress|product word, and XL|size attribute.

The extended attribute data includes: mature young women|suitable audience, polyester|material, street shooting-|style, 25-29 years old|suitable age, summer of 2019|time to market, middle skirt|length of the skirt, splicing|popular element, and high waist|waist type. The attribute data from the above three different sources can be merged to obtain the complete attribute data of commodity.

The attribute data retained after filtering based on the preset rule: apparel underwear|first class category, women's clothing|second class category, dress|third class category, off shoulder|pattern attribute, mature young women|suitable audience, polyester|material, street shooting|style, middle skirt|length of the skirt, splicing|popular element, high waist|waist type, XX|brand word, original|style attribute, summer wear|auxiliary product word, temperament|style attribute, mid-long|pattern attribute, irregular|pattern attribute, halter|pattern attribute, ceremonial dress|auxiliary product word, skirt|product word, white|color attribute, dress|product word, and round collar|collar type.

In an implementation, the preset rule can filter out a part of the attribute data of the commodity. This is because the filter-out part of the attribute data has no obvious effect on the subsequent generation of the commodity copy. By filtering out the part of attribute data, the accuracy of the commodity copy can be ensured and the generation efficiency of the commodity copy can be improved. Herein, the preset rule can be formulated manually based on commodity characteristics.

In operations 101, first key attribute data of the commodity is determined based on a first copy generation model trained in advance, where the first key attribute data represents a part of attribute data of the first attribute data.

In the embodiment of the present disclosure, the first copy generation model is trained in advance to obtain the trained first copy generation model. When the copy is to be generated, the acquired first attribute data of the commodity is used as input data of the first copy generation model, and the output of the first copy generation model is the copy corresponding to the commodity.

In the embodiment of the present disclosure, the copy generation process performed by the first copy generation model mainly includes two stages: content selection and description generation. A result of the content selection is the first key attribute data determined from the first attribute data of the commodity. The first key attribute data represents the content to be emphatically described in the finally output copy. A result of the description generation is a corresponding copy description generated for the first key attribute data.

In an implementation, the first attribute data of the commodity, i.e., "XX|brand word, women's|auxiliary product word, summer wear|auxiliary product word, dress|product word, round collar|collar type", is input to the first copy generation model. If the first copy generation model determines that the first key attribute data of the commodity is "round collar|collar type", the output of the first copy generation model can be "the collar is designed as an elegant round collar".

In some embodiments, the first copy generation model is trained by acquiring a historical copy and second attribute data of the commodity; matching the second attribute data with the historical copy to obtain second key attribute data; taking the historical copy, the second attribute data and the second key attribute data as training data; and training the first copy generation model by using the training data to obtain the trained first copy generation model.

In an implementation, the training process of the first copy generation model includes: the training data including the history copy, the second attribute data and the second key attribute data is input into the model, and network parameters of the model are continuously adjusted by using the back propagation algorithm, so that the key attribute data determined by the model according to the second attribute data is completely the same as the second key attribute data. Furthermore, the commodity copy generated according to the second key attribute data is as consistent as possible with the historical copy.

In an implementation, the historical copy may represent an existing relevant copy describing the commodity, which may be a manually written copy or a copy obtained from a commodity copy corpus. Herein, in order to improve the diversity of commodity copies, multiple historical copies of the commodity can be obtained; and the sources of the multiple historical copies can be set according to actual application scenarios, which is not limited in the embodiments of the present disclosure.

In the embodiment of the present disclosure, the second key attribute data of the commodity is obtained by matching the second attribute data with the historical copy, and the second key attribute data of the commodity is used as intermediate data for the training of the first copy generation model. The acquisition of the second attribute data of the commodity is the same as the acquisition of the first attribute data in operation 100, which will not be elaborated herein.

In an implementation, it is assumed that the historical copy of the commodity is "the overall design is simple fashion, and concise lines outline a refined temperament, so that the temperament characteristics of intellectual and capable are shown; the collar is designed as an elegant round collar, showing modern style in simplicity; and the waist is made of splicing design, making the waist appear to be slender and exhibiting beautiful body lines". The second key attribute data obtained by matching the second attribute data with the historical copy can be: temperament|style attribute, round collar|collar type, and splicing|popular element.

In some embodiments, the first copy generation model includes: a first decoder and a second decoder, where the first decoder is configured to decode the second attribute data to obtain the second key attribute data, and the second decoder is configured to generate a copy description corresponding to the second key attribute data.

Herein, the first copy generation model may be a seq2seq model, which may include an encoder, a first decoder and a second decoder. In the training process of the first copy generation model, the input data of the encoder is an "attribute word|attribute" pair corresponding to the second attribute data of the commodity. A Long Short-Term Memory (LSTM) is used as the encoder to encode the input data so as to obtain hidden variables, as shown in formula (1):

$$h_j = \text{LSTM}(h_{j-1}, x_j) \quad (1),$$

where $h_j$ represents a hidden variable at moment j at the encoding end, $h_{j-1}$ represents a hidden variable at moment j−1 at the encoding end, and $x_j$ represents input data.

The second attribute data of the commodity is decoded by using the first decoder to determine whether the key attribute data of the commodity corresponds to the second key attribute data. The process of decoding the key attribute data $k_i$ of the commodity is shown in formulas (2), (3) and (4):

$$h_i = \text{LSTM}(h_{i-1}, k_{i-1}) \quad (2),$$

$$\hat{h}_i^1 = g(h_i; c_i) \quad (3),$$

$$k_i = \arg\max(\text{soft max}(\hat{h}_i^1)) \quad (4),$$

where $h_{i-1}$ is a hidden state of the second attribute data at a previous moment, $k_{i-1}$ is the second key attribute data at the current moment in the training stage, and the key attribute data decoded at the previous moment in the prediction stage, $h_i$ is the hidden state of the second key attribute data at the current moment, $c_i$ is the attention context vector at the current moment at the coding end, $\hat{h}_i^1$ is the hidden state of the attention data generated at the current moment, and g is a transformation function.

Next, a commodity copy y corresponding to the key attribute data is generated by decoding using a second decoder.

In an implementation, the first copy generation model is trained in a joint training mode in which the selection of the second key attribute data and the generation of the commodity copy are performed simultaneously. The objective function of the model adopts the maximum likelihood function and the objectives of the two stages are simultaneously considered. The joint objective function is shown in formula (5):

$$\max \Sigma_D \log(k|x) + \log p(y|x,k) \quad (5),$$

where x, k, y represents the second attribute data of the commodity, the second key attribute data of the commodity and the commodity copy, respectively. In the formula above, the first term represents a target of the decoding by the first decoder, and the second term indicates represents a target of generating the copy by the second decoder.

It can be seen that the second attribute data, the second key attribute data and the historical copy are needed in the training stage of the first copy generation model. In the prediction stage of the first copy generation model, attribute data is input, and the output is the prediction result.

In an implementation, in the prediction stage of the first copy generation model, the attribute data is input, i.e., the attribute data retained after filtering, including: apparel underwear|first class category, women's clothing|second class category, dress|third class category, off shoulder|pattern attribute, mature young women|suitable audience, polyester|material, street shooting|style, middle skirt|length of the skirt, splicing|popular element, high waist|waist type, XX|brand word, original|style attribute, summer wear|auxiliary product word, temperament|style attribute, mid-long|pattern attribute, irregular|pattern attribute, halter|pattern attribute, ceremonial dress|auxiliary product word, skirt|product word, white|color attribute, dress|product word, and round collar|collar type.

The first decoder decodes key attribute words: temperament style attribute, round collar|collar type, and splicing-|popular element.

The second decoder generates the copy, i.e., the prediction result: the overall design is simple fashion, and concise lines outline a refined temperament, so that the temperament characteristics of intellectual and capable are shown; the collar is designed as an elegant round collar, showing modern style in simplicity; and the waist is made of splicing design, making the waist appear to be slender and exhibiting beautiful body lines.

In some embodiments, the operation that the first copy generation model is trained by using the training data to obtain the trained first copy generation model includes: network parameters of the first decoder are adjusted by using a dual attention mechanism and network parameters of the second decoder are adjusted by using a coverage mechanism, to obtain the trained first copy generation model.

In the embodiment of the present disclosure, in the process of training the first copy generation model, the dual attention mechanism and a coverage mechanism are used to optimize the network. The dual attention mechanism aims at the input data in the form of "attribute word|attribute" pair that is a type of "key vector|value vector" pair. In the decoding stage of the first decoder, the dual attention mechanism is adopted to calculate attention data for both the key vector and the value vector respectively, and attention data distribution adopted in the final decoding stage is the result of fusion of the attention data of the key vector and the attention data of the value vector. In this way, the features of key vector and value vector can be used simultaneously, therefore the planning ability of the first copy generation model and the reliability of the copy can be improved. If the attention data of the attribute word is designated $\alpha_{ij}(1)$ and the attention data of the attribute is designated as $\alpha_{ij}(2)$, the attention data $\alpha_{ij}$ obtained by fusing the attention data of the attribute word with the attention data of the attribute is as shown in formula (6):

$$\alpha_{ij} = \frac{\alpha_{ij}(1) \cdot \alpha_{ij}(2)}{\sum_{j=1}^{J} \alpha_{ij}(1) \cdot \alpha_{ij}(2)}, \quad (6)$$

where J is a length of the encoding sequence, i is an index of the decoding sequence at the current moment, and j is an index of the encoding sequence at the current moment.

The attention context vector $c_i$ at the current moment at the encoding end is shown in formula (7):

$$c_i = \sum_{j=1}^{J} \alpha_{ij} h_j. \quad (7)$$

One problem of the copy generation model is that it is easy to generate duplicative description, including literal duplication and semantic duplication. The reason for this problem is that the model repeatedly describes a certain input feature data. The coverage mechanism can restrain the generation of the duplicative descriptions. The core idea of the coverage mechanism is: the described attribute words are tracked in the process of copy generation, so that the first copy generation model no longer pays attention to the described attribute words. Therefore, the duplication of the commodity copy is reduced and the quality of copy is improved.

The specific operation is that, firstly, the attention context vector $c_i$ in the historical state is maintained and used as input feature to calculate the attention data $\alpha_{ij}(1)$ of the attribute word and the attention data $\alpha_{ij}(2)$ of the attribute at the current moment, as shown in formula (8):

$$\alpha_{ij}(1) = \frac{\exp(e_{ij})}{\sum_{j'=1}^{J} \exp(e_{ij'})}, \tag{8}$$

where j' is an index of the encoding sequence at different moments, and the calculation formula of $\alpha_{ij}(2)$ is the same as that of $\alpha_{ij}(1)$; $e_{ij}$ is a weight calculated to measure the relationship between the hidden state $h_i$ of the second key attribute data at the current time at the decoding end and the hidden variable $h_j$ at moment j at the encoding end.

For words with an excessive weight that repeatedly appear, an appropriate penalty is given in the loss function, as shown in formula (9):

$$\text{covloss}_j = \Sigma_i \min(\alpha_{ij}, c_{ij}) \tag{9},$$

where $c_{ij}$ it is a result of accumulating the attention context vectors at different moments at the coding end.

In operation 102, a first candidate copy set of the commodity is obtained according to the first key attribute data, where the first candidate copy set represents a set of at least one commodity copy.

In the embodiment of the present disclosure, after the first key attribute data is obtained, the first copy generation model can generate a copy description for the first key attribute data according to the first key attribute data. Herein, there may be one or more copy descriptions generated corresponding to each piece of key attribute data.

In an implementation, for the first key attribute data "round collar|collar type", the corresponding copy description generated by the first copy generation model may be "the collar is designed as a round collar"; and can also be "the collar of the dress is designed as an elegant round collar" or the like.

In some embodiments, the operation that the first candidate copy set of the commodity is obtained according to the first key attribute data include: a copy description for the first key attribute data is generated in a sentence-wise manner according to the first key attribute data, where each piece of the first key attribute data corresponds to at least one copy description; the at least one copy description corresponding to each piece of the first key attribute data is spliced to generate at least one commodity copy; and the first candidate copy set of the commodity is obtained based on the at least one commodity copy.

In an implementation, since a corresponding copy description can be generated for each piece of key attribute data, multiple different copy descriptions can be generated corresponding to the first key attribute data in a case where the first key attribute data includes multiple pieces of attribute data. By splicing the multiple different copy descriptions, multiple commodity copies can be obtained, and then the first candidate copy set of commodity can be obtained.

In an implementation, it is assumed that the first key attribute data includes an attribute M and an attribute N, a copy description 1 and a copy description 2 can be generated according to attribute M, and a copy description 3 can be generated according to the attribute N. By splicing the description 1 and the copy description 3, and splicing the copy description 2 and the copy description 3, two copies can be finally obtained, and these two copies are taken as the first candidate copy set.

In some embodiments, the operation that the first candidate copy set of the commodity is obtained based on the at least one commodity copy includes: at least one of a duplication degree or a consistency for each commodity copy is determined to obtain a determination result, where the duplication degree represents a degree of duplication between different copy descriptions in each commodity copy, and the consistency represents a consistency degree between attribute data of each commodity copy and the first attribute data; and the first candidate copy set of the commodity is obtained according to the determination result.

In the embodiments of the present disclosure, after splicing different copy descriptions of the key attribute data, the duplication degree and/or the consistency of each spliced commodity copy can also be determined. This process is mainly implemented in a beam search stage of the first copy generation model.

The determination of the duplication degree is a literal duplication determination and a semantic level determination of the word vector for each commodity copy, i.e., which determines whether there are successive and duplicated characters, words or sub-sentences and semantically duplicated sub-sentences. The consistency determination is a determination for the attribute words, the consistency degree between the attribute word of each commodity copy and each attribute word of the first attribute data is determined, i.e., it is determined whether the generated copy includes an attribute word that does not exist in the input data. The attribute word can be obtained by matching the attribute vocabulary with the generated copy, and the attribute vocabulary can be obtained by corpus statistics.

In the beam search stage of predicting commodity copy through the first copy generation model, a hard rule method may be adopted to determine the duplication degree between different copy descriptions in each commodity copy to obtain a determination result. If the determination result shows that there are duplicated characters, words or sub-sentences or semantically duplicated sub-sentences between the generated copy descriptions, the commodity copy is deleted. That is to say, only when the determination result shows that there is no duplication between any different copy descriptions in the generated commodity copy, the commodity copy can be output.

Furthermore, the consistency degree between the attribute word of each commodity copy and each attribute word of the first attribute data is determined to obtain a determination result. If the determination result shows that the generated commodity copy includes an attribute word that does not exist in the input data, the commodity copy is deleted. That is to say, only when the determination result shows that all attribute words included in the generated commodity copy correspond to the attribute words in the input data, the commodity copy can be output.

FIG. 2 is a schematic diagram of a result of a copy output by a first copy generation model according to an embodiment of the present disclosure. As shown in FIG. 2, the commodity attributes are the input data of the first copy generation model, and the commodity copy obtained and output after decoding is a generation result without the determinations of the duplication degree and the consistency. It can be seen that "high waist" in the generation result is inconsistent with the input data of the first copy generation model, and there is duplication between "more comfortable to wear" and "making your wearing more comfortable". After the determinations of the duplication degree and the consistency are added, "high waist" is replaced with "middle waist" and "making your wearing more comfortable" is replaced with "doubling your fashion sense". It can be seen that by adding the determinations of the duplication degree and the consistency, the wrong description in the generated results of the first copy generation model can be corrected, and the quality of the commodity copy can be improved.

In operation 103, candidate copy data is screened according to a quality determination rule to determine a target commodity copy, where the candidate copy data includes one or more commodity copies in the first candidate copy set.

In the embodiment of the present disclosure, after the first candidate copy set is obtained, the commodity copies in the first candidate copy set are screened based on the quality determination rule, and the finally output target commodity copy is determined.

Herein, the quality determination rule includes at least one of: quality of the commodity copies is screened based on a duplication degree, where the duplication degree represents a degree of duplication between different copy descriptions in each commodity copy; the quality of the commodity copies is screened based on consistency, where the consistency represents a consistency degree between the attribute data of each commodity copy and the first attribute data; the quality of the commodity copies is screened based on a perplexity, where the perplexity represents a clarity degree of each copy description of each commodity copy; or the quality of the commodity copies is screened based on an attribute coverage degree, where the attribute coverage degree represents a degree of coverage of the first attribute data in each commodity copy.

In an implementation, the commodity copies in the first candidate copy set may be filtered based on the duplication degree. The duplication degree includes literal duplication and semantic duplication. For the literal duplication, it can be determined whether there is duplication between different copy descriptions in each commodity copy by establishing rules, such as duplication of adjacent characters or words, duplication of sub-sentences, and duplication of attribute words. For the semantic duplication, if similar words or similar sub-sentences are found through a manner of training the word2vec, it is determined that there is duplication between the commodity copies.

In an implementation, the commodity copies in the first candidate copy set may be filtered based on the consistency. Ensuring the consistency of the input data and the output data is a basic requirement for the first copy generation model, thus in addition to optimization of the model to generate a consistent description, in order to ensure the consistency between the attribute data of the finally output copy and the input data (i.e., the first attribute data), taking the characteristics of the copy data into consideration, a manner of matching attribute words is adopted to determine the consistency of the finally output copy, and it is necessary to construct an attribute vocabulary. It is detected whether the attribute words in the copy are in conflict with the attribute words in the input data based on the attribute vocabulary. The attribute vocabulary is constructed based on the training data. In the construction, a proportion of the frequency of an attribute word appearing in the copy to the frequency of the attribute word appearing in input attributes is considered; furthermore, objective attributes, such as the material attribute, are retained, and subjective attributes, such as the pattern attribute, are deleted.

In an implementation, commodity copies in the first candidate copy set may be sequenced based on the perplexity. The descriptions generated by the first copy model may not be smooth. In order to measure the smoothness of the generated copy, a perplexity index in the language model is used for measuring the copy. The copies are sequenced, and the higher the perplexity, the worse the smoothness in general. Probabilities under the binary model are counted based on existing commodity copy data as basic data, and the perplexity index is calculated based on a counting result. The perplexities of all candidate copies of the current commodity are calculated based on the perplexity index, the perplexities are taken as measurement indexes to sequence the candidate copies in an ascending order of the perplexities, and several candidate copies in the front of the sequenced candidate copies are taken as a new candidate copy set of the current commodity.

In an implementation, the commodity copies in the first candidate copy set may be sequenced based on attribute coverage degree. After the attribute data of the commodity obtained from multiple information sources, such as the title and the extended attribute, are filtered, the retained attribute data is used as the input of the copy generation model. A goal of the generated copy includes describing the input attributes specifically and attracting the purchase interest of users. The quality of the commodity copy can be determined according to the number of input attribute words included in the generated copy. The more the input attribute words described, the higher the score of the commodity copy, and the better the quality of the copy.

In some embodiments, the operation that the candidate copy data is screened according to the quality determination rule may include: after the first attribute data of the commodity is obtained, the first attribute data is input into at least two copy generation models to obtain a second candidate copy set of the commodity, where the at least two copy generation models includes the first copy generation model; and the candidate copy data is screened according to the quality determination rule, where the candidate copy data includes commodity copies in the second candidate copy set.

In the process of generating the copy, besides the trained first copy generation model, other copy generation models can also be adopted. That is to say, various copy generation models are compatible with the technical scheme of the embodiment of the present disclosure.

For the task of generating the commodity copy, instead of relying solely on a certain end-to-end copy generation model, the copy corresponding to the commodity is generated based on various copy generation models to obtain the second candidate copy set of the commodity; and then the commodity copies in the second candidate copy set are screened based on the quality determination rule to output commodity copies satisfying the requirements. It can be seen that the accuracy and the recall of the commodity copies generated in this way can satisfy actual requirements of the industry.

It can be seen that the candidate copy data is screened through the above-mentioned four aspects of the quality determination rule including duplication degree, consistency, perplexity and attribute coverage degree, thus not only problematic commodity copies are filtered out, but also a copy with high confidence and high coverage is retained as the final output to ensure the quality of the commodity copy.

The embodiments of the present disclosure provide a method and device for generating a copy, an electronic device, a computer storage medium and a computer program product. The method includes: first attribute data of a commodity is acquired; first key attribute data of the commodity is determined based on a first copy generation model trained in advance, where the first key attribute data represents a part of attribute data of the first attribute data; a first candidate copy set of the commodity is obtained according to the first key attribute data, where the first candidate copy set represents a set of at least one commodity copy; and candidate copy data is screened according to a quality determination rule to determine a target commodity copy, where the candidate copy data includes one or more commodity copies in the first candidate copy set. In this way, the commodity copy does not need to be written by manual, and instead, it is automatically generated directly based on attribute data of a commodity and the first copy generation model trained in advance, which can improve the generation efficiency of the commodity copy. Furthermore, the generated commodity copies are screened according to the quality determination rule, which can ensure the quality of the commodity copy and the fit degree between the commodity copy and the commodity.

In order to better embody the purpose of the present disclosure, further illustration and description is made on the basis of the above-described embodiments of the present disclosure.

Figure 3:
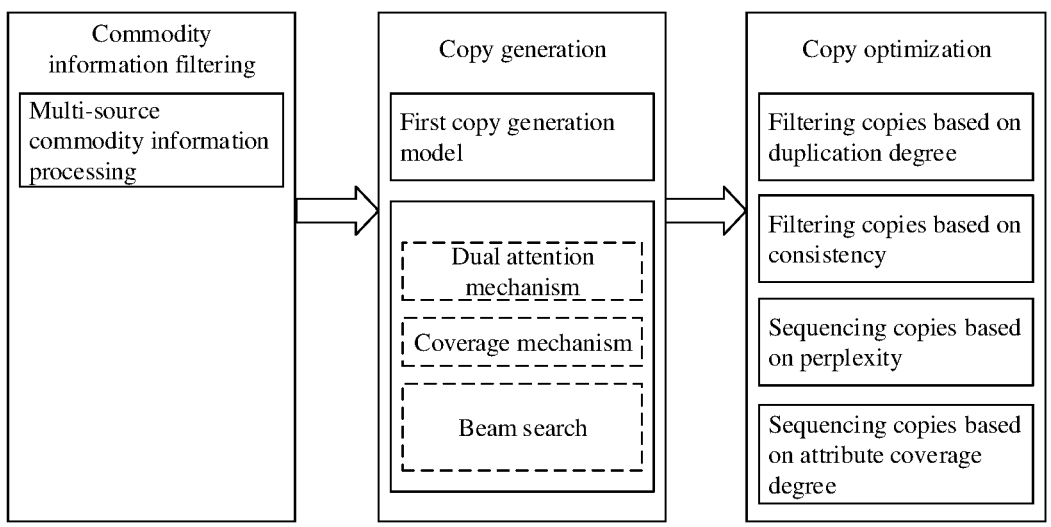
FIG. 3 is a schematic structural diagram of a copy generation framework according to an embodiment of the present disclosure.

FIG. 3 is a schematic structural diagram of a copy generation framework according to an embodiment of the present disclosure. As shown in FIG. 3, the framework includes three modules: a commodity information filtering module, a copy generation module and a copy optimization module. The commodity information filtering module is configured to: obtain a commodity category, a brand name, a product word and several modifiers which can accurately reflect commodity characteristics from multi-source commodity information such as commodity title, commodity category and extended information of commodity; extract attribute data including attribute words and attributes from the category, the brand name, the product word and modifiers; and filter the acquired attribute data to extract attribute information (that is, the first attribute data) of the commodity for generating the copy.

The copy generation module is configured to sort and screen, based on the first copy generation model, the first attribute data output by the commodity information filtering module to determine the first key attribute data of the commodity. The dual attention mechanism and coverage mechanism are used in the training stage of the first copy generation model, and the beam search is used in the prediction stage of the first copy generation model. Multiple candidate copies are generated by adopting the first copy generation model, and the duplication degree and/or the consistency for each commodity copy is determined. The duplication degree represents a degree of duplication between different copy descriptions in each commodity copy, and the consistency represents a consistency degree between attribute data of each commodity copy and the first attribute data. All candidate copies after optimization (i.e., the first candidate copy set) are obtained according to a determination result.

The copy optimization module is configured to filter out the problematic commodity copies in the first candidate copy set based on the duplication degree and the consistency, sequence the commodity copies in the first candidate copy set based on the perplexity and the attribute coverage degree, and retain several commodity copies with high confidence and high coverage as a final output, i.e., the target commodity copies.

Figure 4:
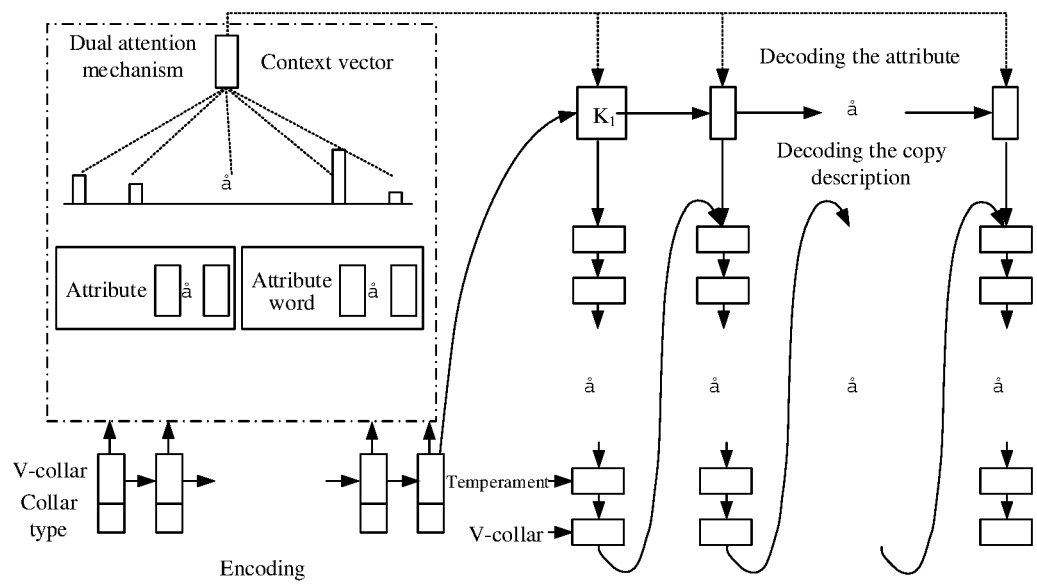
FIG. 4 is a schematic structural diagram of a first copy generation model according to an embodiment of the present disclosure.

FIG. 4 is a schematic structural diagram of a first copy generation model according to an embodiment of the present disclosure. As shown in FIG. 4, the process flow of predicting by using the first copy generation model is as follows. The acquired first attribute data "attribute word|attribute" of the commodity, for example, "V-collar|collar type", as the input data is input into the encoder; attention data is respectively calculated for the attribute word and the attribute by using the dual attention mechanism, and the attention data of attribute word corresponding to each piece of attribute data is fused the attention data of the attribute corresponding to the attribute data based on the context vector to obtain weight distribution of the attention data of each piece of attribute data; and the first decoder is used to decode the attribute data to obtain the first key attribute data K1, and the second decoder is used to decode the copy to obtain the copy description corresponding to each piece of key attribute data.

Figure 5A:
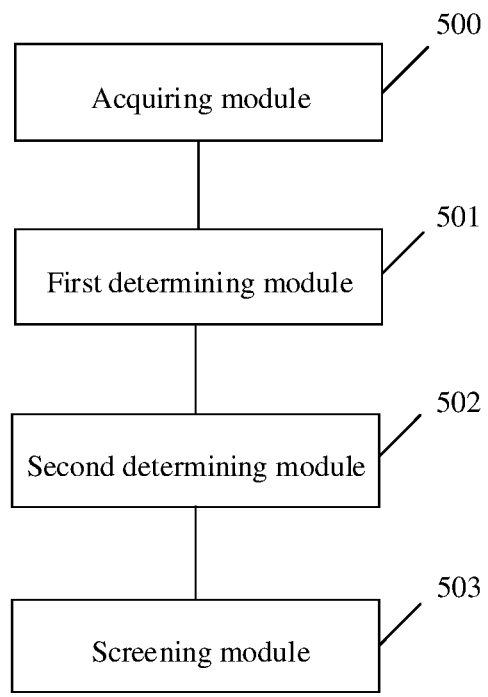
FIG. 5a is a schematic structural diagram of a copy generation apparatus according to the embodiment of the present disclosure.

FIG. 5a is a schematic structural diagram of a device for generating a copy according to an embodiment of the present disclosure. As shown in FIG. 5a, the device includes an acquiring module 500, a first determining module 501, a second determining module 502 and a screening module 503 where.

The acquiring module 500 is configured to acquire first attribute data of a commodity.

The first determining module 501 is configured to determine first key attribute data of the commodity based on a first copy generation model trained in advance, where the first key attribute data represents a part of attribute data of the first attribute data.

The second determination module 502 is configured to obtain a first candidate copy set of the commodity according to the first key attribute data, where the first candidate copy set represents a set of at least one commodity copy.

The screening module 503 is configured to screen candidate copy data according to a quality determination rule to determine a target commodity copy, where the candidate copy data includes one or more commodity copies in the first candidate copy set.

In some embodiments, the second determining module 502 configured to obtain the first candidate copy set of the commodity according to the first key attribute data is specifically configured to:
  generate a copy description for the first key attribute data in a sentence-wise manner according to the first key attribute data, where each piece of the first key attribute data corresponds to at least one copy description;
  splice the at least one copy description corresponding to each piece of the first key attribute data to generate at least one commodity copy; and
  obtain the first candidate copy set of the commodity based on the at least one commodity copy.

In some embodiments, the second determination module 502 configured to obtain the first candidate copy set of the commodity according to the first key attribute data is specifically configured to:

determine at least one of a duplication degree or a consistency for each commodity copy to obtain a determination result, where the duplication degree represents a degree of duplication between different copy descriptions in each commodity copy, and the consistency represents a consistency degree between attribute data of each commodity copy and the first attribute data; and obtain the first candidate copy set of the commodity according to the determination result.

Figure 5B:
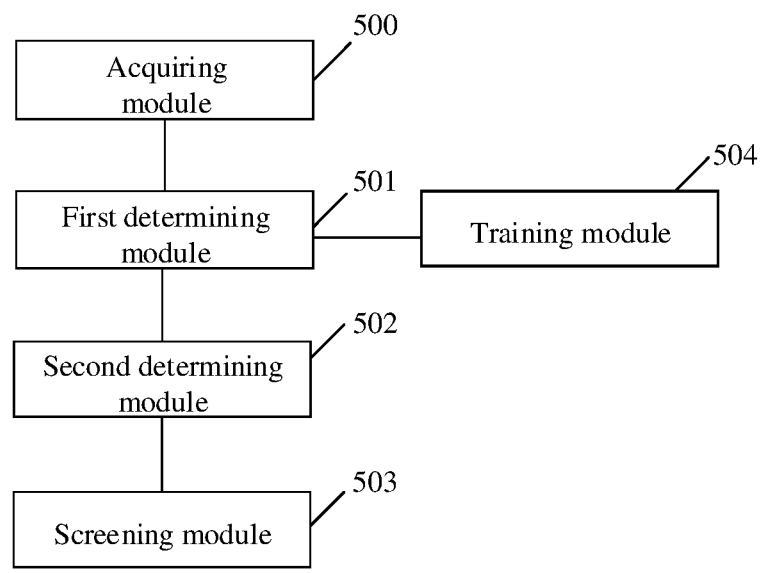
FIG. 5b is a schematic structural diagram of another copy generation device according to the embodiment of the present disclosure.

FIG. 5b is a schematic structural diagram of a device for generating a copy according to another embodiment of the present disclosure. As shown in FIG. 5b, the device further includes a training module 504.

The training module 504 is configured to obtain a historical copy and second attribute data of the commodity.

The training module 504 is configured to match the second attribute data with the historical copy to obtain second key attribute data.

The training module 504 is configured to take the historical copy, the second attribute data and the second key attribute data as training data.

The training module 504 is configured to train the first copy generation model by using the training data to obtain a trained first copy generation model.

In some embodiments, the first copy generation model includes: a first decoder and a second decoder, where the first decoder is configured to decode the second attribute data to obtain the second key attribute data, and the second decoder is configured to generate a copy description corresponding to the second key attribute data.

In some embodiments, the training module 504 configured to train the first copy generation model by using the training data to obtain the trained first copy generation model is specifically configured to:

adjust network parameters of the first decoder by using a dual attention mechanism and adjust network parameters of the second decoder by using a coverage mechanism, to obtain the trained first copy generation model.

In some embodiments, the screening module 503 configured to screen candidate copy data according to the quality determination rule to determine the target commodity copy is specifically configured to:

after obtaining the first attribute data of the commodity, input the first attribute data into at least two copy generation models to obtain a second candidate copy set of the commodity, where the at least two copy generation models includes the first copy generation model; and screen the candidate copy data according to the quality determination rule, where the candidate copy data includes commodity copies in the second candidate copy set.

In some embodiments, the quality determination rule includes at least one of the following.

The quality of the commodity copies is screened based on a duplication degree, where the duplication degree represents a degree of duplication between different copy descriptions in each commodity copy.

The quality of the commodity copies is screened based on consistency, where the consistency represents a consistency degree between the attribute data of each commodity copy and the first attribute data.

The quality of the commodity copies is screened based on a perplexity, where the perplexity represents a clarity degree of each copy description of each commodity copy.

The quality of the commodity copies is screened based on an attribute coverage degree, where the attribute coverage degree represents a degree of coverage of the first attribute data in each commodity copy.

In practical applications, the acquiring module 500, the first determining module 501, the second determining module 502, the screening module 503, and the training module 504 may all be implemented by a processor located in an electronic device. The processor may be at least one of an ASIC, a DSP, a DSPD, a PLD, an FPGA, a CPU, a controller, a microcontroller, and a microprocessor.

In addition, each functional unit in each embodiment of the present disclosure may be integrated in one processing unit, each unit may exist physically alone, or two or more units may be integrated in one unit. The integrated unit may be implemented in the form of hardware or in the form of software functional units.

If the integrated unit is implemented in the form of a software function unit and sold or used as an independent product, it can be stored in a computer readable storage medium. Based on such understanding, the technical solution of the present disclosure, in essence or in the form of a software product, which is stored in a storage medium, includes several instructions for making a computer device (which can be a personal computer, a server, a network device, etc.) or a processor to perform all or part of the steps of the method according to each embodiment of the present disclosure. The aforementioned storage media include: U disk, mobile hard disk, read-only memory (ROM), random access memory (RAM), disk or optical disk and other media that can store program code.

Specifically, the computer program instructions corresponding to the method for generating a copy in the embodiments can be stored on a storage medium such as an optical disk, a hard disk, a U disk, etc. When the computer program instructions corresponding to a method for generating a copy in the storage medium are read or executed by an electronic device, any method for generating a copy in the embodiments is implemented.

Figure 6:
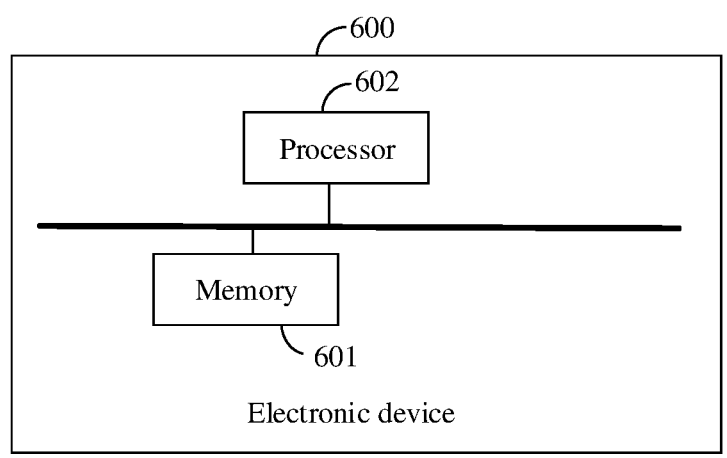
FIG. 6 is a schematic structural diagram of an electronic device according to an embodiment of the present disclosure.

Based on the same technical concept of the previous embodiments, with reference to FIG. 6, an electronic device 600 provided by the present disclosure is shown. The electronic device 600 may include a memory 601 and a processor 602.

The memory 601 is configured to store computer programs and data.

The processor 602 is configured to execute computer programs stored in memory to implement any of the methods for generating a copy of the foregoing embodiments.

In practical applications, the above-mentioned memory 601 may be a volatile memory, such as RAM; or a non-volatile memory, such as ROM, flash memory, Hard Disk Drive (HDD) or Solid-State Drive (SSD); or a combination of the kinds of memories described above. The memory 601 is configured to provide instructions and data to the processor 602.

The processor 602 may be at least one of an ASIC, a DSP, a DSPD, a PLD, an FPGA, a CPU, a controller, a microcontroller, and a microprocessor. It is to be understood that the electronic devices for implementing the processor functions described above may be other for different devices for generating a copy, which is not limited in the embodiments of the present disclosure.

In some embodiments, the function or included module of the apparatus provided by the embodiment of the present disclosure may be configured to execute the method described in the above method embodiments, and the specific implementation may refer to the description in the above method embodiments. For the simplicity, the details are not elaborated herein.

The above description of the various embodiments tends to emphasize the differences between the various embodiments, the similarities of which may be referred to each other and will not be repeated herein for the sake of brevity.

The methods disclosed in the method embodiments provided in the disclosure can be arbitrarily combined without conflict to obtain new method embodiments.

The features disclosed in the product embodiments provided in this disclosure can be arbitrarily combined without conflict to obtain new product embodiments.

The features disclosed in the method or apparatus embodiments provided in this disclosure can be arbitrarily combined without conflict to obtain new method embodiments or apparatus embodiments.

Those skilled in the art will appreciate that embodiments of the present disclosure may be provided as methods systems or computer program products. Accordingly the present disclosure may take the form of a hardware embodiment a software embodiment or an embodiment combining software and hardware aspects. Furthermore, the present disclosure may take the form of a computer program product implemented on one or more computer-usable storage media (including, but not limited to, disk storage, optical storage, etc.) including computer-usable program code therein.

The present disclosure is described with reference to flowcharts and/or block diagrams of methods, devices (systems), and computer program products of the embodiments of the present disclosure. It should be understood that a computer program instruction is configured to implement each flow and/or block in the flowcharts and/or block diagrams, and the combination of flows/blocks in the flowcharts and/or block diagrams. These computer program instructions may be provided to a universal computer, a special computer, an embedded processor or processors of other programmable data processing devices to generate a machine such that an apparatus for implementing the functions specified in one or more flow in the flowcharts and/or one or more blocks in the block diagrams is generated through the instructions executed by the computer or the processor of other programmable data processing devices.

These computer program instructions may also be loaded in a computer or other programmable data processing devices such that a series of operation steps are executed on the computer or other programmable data processing devices to generate computer implemented processing, and thus the instruction executed on the computer or other programmable data processing devices provides the operations for implementing the functions specified in one or more flows in the flowchart and/or one or more blocks in the block diagram.

The above is only preferred embodiments of the present disclosure and is not intended to limit the scope of protection of the present disclosure.

The invention claimed is:

1. A method for generating a copy, comprising:
acquiring first attribute data of a commodity;
determining first key attribute data of the commodity based on a first copy generation model trained in advance, wherein the first key attribute data represents a part of attribute data of the first attribute data;
obtaining a first candidate copy set of the commodity according to the first key attribute data, wherein the first candidate copy set represents a set of at least one commodity copy; and
screening candidate copy data according to a quality determination rule to determine a target commodity copy, wherein the candidate copy data comprises one or more commodity copies in the first candidate copy set;
wherein screening the candidate copy data according to the quality determination rule to determine the target commodity copy comprises:
after obtaining the first attribute data of the commodity, inputting the first attribute data into at least two copy generation models to obtain a second candidate copy set of the commodity, wherein the at least two copy generation models comprises the first copy generation model; and
screening the candidate copy data according to the quality determination rule, wherein the candidate copy data comprises commodity copies in the second candidate copy set;
wherein the quality determination rule comprises:
screening quality of the one or more commodity copies in the first candidate copy set and the commodity copies in the second candidate copy set based on a duplication degree, wherein the duplication degree represents a degree of duplication between different copy descriptions in each of the one or more commodity copies in the first candidate copy set and the commodity copies in the second candidate copy set;
screening the quality of the one or more commodity copies in the first candidate copy set and the commodity copies in the second candidate copy set based on consistency, wherein the consistency represents a consistency degree between the attribute data of each of the one or more commodity copies in the first candidate copy set and the commodity copies in the second candidate copy set and the first attribute data;
screening the quality of the one or more commodity copies in the first candidate copy set and the commodity copies in the second candidate copy set based on a perplexity, wherein the perplexity represents a clarity degree of each copy description of each of the one or more commodity copies in the first candidate copy set and the commodity copies in the second candidate copy set; and
screening the quality of the one or more commodity copies in the first candidate copy set and the commodity copies in the second candidate copy set based on an attribute coverage degree, wherein the attribute coverage degree represents a degree of coverage of the first attribute data in each of the one or more commodity copies in the first candidate copy set and the commodity copies in the second candidate copy set.

2. The method of claim 1, wherein obtaining the first candidate copy set of the commodity according to the first key attribute data comprises:
generating a copy description for the first key attribute data in a sentence-wise manner according to the first key attribute data, wherein each piece of the first key attribute data corresponds to at least one copy description;
splicing the at least one copy description corresponding to each piece of the first key attribute data to generate at least one commodity copy; and obtaining the first candidate copy set of the commodity based on the at least one commodity copy.

3. The method of claim 2, wherein obtaining the first candidate copy set of the commodity based on the at least one commodity copy comprises:
determining at least one of a duplication degree or a consistency for each of the at least one commodity copy to obtain a determination result, wherein the duplication degree represents a degree of duplication between different copy descriptions in each of the at least one commodity copy, and the consistency represents a consistency degree between attribute data of each of the at least one commodity copy and the first attribute data; and
obtaining the first candidate copy set of the commodity according to the determination result.

4. The method of claim 1, wherein the first copy generation model is trained by:
acquiring a historical copy and second attribute data of the commodity;
matching the second attribute data with the historical copy to obtain second key attribute data;
taking the historical copy, the second attribute data and the second key attribute data as training data; and
training the first copy generation model by using the training data to obtain a trained first copy generation model.

5. The method of claim 4, wherein the first copy generation model comprises: a first decoder and a second decoder, wherein the first decoder is configured to decode the second attribute data to obtain the second key attribute data, and the second decoder is configured to generate a copy description corresponding to the second key attribute data.

6. The method of claim 5, wherein training the first copy generation model by using the training data to obtain the trained first copy generation model comprises:
adjusting network parameters of the first decoder by using a dual attention mechanism and adjusting network parameters of the second decoder by using a coverage mechanism, to obtain the trained first copy generation model.

7. A device for generating a copy, comprising:
a memory storing processor-executable instructions; and
a processor arranged to execute the stored processor-executable instructions to perform operations of:
acquiring first attribute data of a commodity;
determining first key attribute data of the commodity based on a first copy generation model trained in advance, wherein the first key attribute data represents a part of attribute data of the first attribute data;
obtaining a first candidate copy set of the commodity according to the first key attribute data, wherein the first candidate copy set represents a set of at least one commodity copy; and
screening candidate copy data according to a quality determination rule to determine a target commodity copy, wherein the candidate copy data comprises one or more commodity copies in the first candidate copy set;
wherein screening the candidate copy data according to the quality determination rule to determine the target commodity copy comprises:
after obtaining the first attribute data of the commodity, inputting the first attribute data into at least two copy generation models to obtain a second candidate copy set of the commodity, wherein the at least two copy generation models comprises the first copy generation model; and
screening the candidate copy data according to the quality determination rule, wherein the candidate copy data comprises commodity copies in the second candidate copy set;
wherein the quality determination rule comprises:
screening quality of the one or more commodity copies in the first candidate copy set and the commodity copies in the second candidate copy set based on a duplication degree, wherein the duplication degree represents a degree of duplication between different copy descriptions in each of the one or more commodity copies in the first candidate copy set and the commodity copies in the second candidate copy set;
screening the quality of the one or more commodity copies in the first candidate copy set and the commodity copies in the second candidate copy set based on consistency, wherein the consistency represents a consistency degree between the attribute data of each of the one or more commodity copies in the first candidate copy set and the commodity copies in the second candidate copy set and the first attribute data;
screening the quality of the one or more commodity copies in the first candidate copy set and the commodity copies in the second candidate copy set based on a perplexity, wherein the perplexity represents a clarity degree of each copy description of each of the one or more commodity copies in the first candidate copy set and the commodity copies in the second candidate copy set; and
screening the quality of the one or more commodity copies in the first candidate copy set and the commodity copies in the second candidate copy set based on an attribute coverage degree, wherein the attribute coverage degree represents a degree of coverage of the first attribute data in each of the one or more commodity copies in the first candidate copy set and the commodity copies in the second candidate copy set.

8. The device of claim 7, wherein obtaining the first candidate copy set of the commodity according to the first key attribute data comprises:
generating a copy description for the first key attribute data in a sentence-wise manner according to the first key attribute data, wherein each piece of the first key attribute data corresponds to at least one copy description;
splicing the at least one copy description corresponding to each piece of the first key attribute data to generate at least one commodity copy; and
obtaining the first candidate copy set of the commodity based on the at least one commodity copy.

9. The device of claim 8, wherein obtaining the first candidate copy set of the commodity based on the at least one commodity copy comprises:
determining at least one of a duplication degree or a consistency for each of the at least one commodity copy to obtain a determination result, wherein the duplication degree represents a degree of duplication between different copy descriptions in each of the at least one commodity copy, and the consistency represents a consistency degree between attribute data of each of the at least one commodity copy and the first attribute data; and obtaining the first candidate copy set of the commodity according to the determination result.

10. The device of claim 7, wherein the first copy generation model is trained by:
    acquiring a historical copy and second attribute data of the commodity;
    matching the second attribute data with the historical copy to obtain second key attribute data;
    taking the historical copy, the second attribute data and the second key attribute data as training data; and
    training the first copy generation model by using the training data to obtain a trained first copy generation model.

11. The device of claim 10, wherein the first copy generation model comprises: a first decoder and a second decoder, wherein the first decoder is configured to decode the second attribute data to obtain the second key attribute data, and the second decoder is configured to generate a copy description corresponding to the second key attribute data.

12. The device of claim 11, wherein training the first copy generation model by using the training data to obtain the trained first copy generation model comprises:
    adjusting network parameters of the first decoder by using a dual attention mechanism and adjusting network parameters of the second decoder by using a coverage mechanism, to obtain the trained first copy generation model.

13. A non-transitory computer storage medium having stored thereon processor-executable instructions that, when executed by a processor, cause the processor to implement a method for generating a copy, the method comprising:
    acquiring first attribute data of a commodity;
    determining first key attribute data of the commodity based on a first copy generation model trained in advance, wherein the first key attribute data represents a part of attribute data of the first attribute data;
    obtaining a first candidate copy set of the commodity according to the first key attribute data, wherein the first candidate copy set represents a set of at least one commodity copy; and
    screening candidate copy data according to a quality determination rule to determine a target commodity copy, wherein the candidate copy data comprises one or more commodity copies in the first candidate copy set;
    wherein screening the candidate copy data according to the quality determination rule to determine the target commodity copy comprises:
        after obtaining the first attribute data of the commodity, inputting the first attribute data into at least two copy generation models to obtain a second candidate copy set of the commodity, wherein the at least two copy generation models comprises the first copy generation model; and
        screening the candidate copy data according to the quality determination rule, wherein the candidate copy data comprises commodity copies in the second candidate copy set;
    wherein the quality determination rule comprises:
        screening quality of the one or more commodity copies in the first candidate copy set and the commodity copies in the second candidate copy set based on a duplication degree, wherein the duplication degree represents a degree of duplication between different copy descriptions in each of the one or more commodity copies in the first candidate copy set and the commodity copies in the second candidate copy set;
        screening the quality of the one or more commodity copies in the first candidate copy set and the commodity copies in the second candidate copy set based on consistency, wherein the consistency represents a consistency degree between the attribute data of each of the one or more commodity copies in the first candidate copy set and the commodity copies in the second candidate copy set and the first attribute data;
        screening the quality of the one or more commodity copies in the first candidate copy set and the commodity copies in the second candidate copy set based on a perplexity, wherein the perplexity represents a clarity degree of each copy description of each of the one or more commodity copies in the first candidate copy set and the commodity copies in the second candidate copy set; and
        screening the quality of the one or more commodity copies in the first candidate copy set and the commodity copies in the second candidate copy set based on an attribute coverage degree, wherein the attribute coverage degree represents a degree of coverage of the first attribute data in each of the one or more commodity copies in the first candidate copy set and the commodity copies in the second candidate copy set.

14. The non-transitory computer storage medium of claim 13, wherein obtaining the first candidate copy set of the commodity according to the first key attribute data comprises:
    generating a copy description for the first key attribute data in a sentence-wise manner according to the first key attribute data, wherein each piece of the first key attribute data corresponds to at least one copy description;
    splicing the at least one copy description corresponding to each piece of the first key attribute data to generate at least one commodity copy; and
    obtaining the first candidate copy set of the commodity based on the at least one commodity copy.

* * * * *